United States Patent
Ueda et al.

(10) Patent No.: US 9,383,627 B2
(45) Date of Patent: Jul. 5, 2016

(54) FLASH DEVICE AND IMAGE CAPTURE DEVICE PROVIDED WITH FLASH DEVICE

(71) Applicant: Panasonic Corporation, Osaka (JP)

(72) Inventors: Tomoaki Ueda, Nara (JP); Takashi Umehara, Osaka (JP); Kazuhiko Ooyama, Hyogo (JP); Katsunori Kawabata, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 221 days.

(21) Appl. No.: 14/349,740

(22) PCT Filed: Sep. 26, 2012

(86) PCT No.: PCT/JP2012/006113
§ 371 (c)(1),
(2) Date: Apr. 4, 2014

(87) PCT Pub. No.: WO2013/051217
PCT Pub. Date: Apr. 11, 2013

(65) Prior Publication Data
US 2014/0240950 A1    Aug. 28, 2014

(30) Foreign Application Priority Data

Oct. 7, 2011  (JP) .................................. 2011-222494
Apr. 17, 2012 (JP) .................................. 2012-093626

(51) Int. Cl.
*G03B 15/02*   (2006.01)
*G03B 15/05*   (2006.01)

(52) U.S. Cl.
CPC ............... *G03B 15/05* (2013.01); *G03B 15/02* (2013.01); *G03B 2215/0521* (2013.01)

(58) Field of Classification Search
CPC ...... H04N 5/2256; G03B 15/03; G03B 15/05; G03B 2215/0521
See application file for complete search history.

(56) References Cited

U.S. PATENT DOCUMENTS 5,266,990 A * 11/1993 Sakamoto ............... G03B 15/05
                                                       396/175
5,911,085 A *  6/1999 Fuke ....................... G03B 15/05
                                                       362/18

(Continued)

FOREIGN PATENT DOCUMENTS

EP    2518993 A1    10/2012
JP    07-230111 A    8/1995

(Continued)

OTHER PUBLICATIONS

International Search Report for Application No. PCT/JP2012/006113, dated Jan. 8, 2013.

*Primary Examiner* — Peggy Neils
(74) *Attorney, Agent, or Firm* — RatnerPrestia (57) ABSTRACT

A flash device of the present invention includes a flash main body, a light emitting section rotatably coupled to the flash main body, and a variable mechanism that can vary the angle in the vertical direction of the light emitting section between a normal irradiation direction angle and a desired irradiation direction angle different from the normal irradiation direction angle. The flash device further includes a drive section for driving the variable mechanism, a vertical direction angle detecting section for detecting the angle in the vertical direction of the light emitting section, and a control device for changing, with the drive section, the angle in the vertical direction of the light emitting section to the desired irradiation direction angle based on a detection signal of the vertical direction angle detecting section. Thus, the angle can be instantly changed to the desired irradiation direction angle, the time taken for preparation for photographing can be reduced, and a subject can be bounce-photographed without missing the photo opportunity.

18 Claims, 7 Drawing Sheets

(56) References Cited

U.S. PATENT DOCUMENTS

| | | | |
|---|---|---|---|
| 6,067,422 A * | 5/2000 | Tokunaga | G03B 7/16 396/157 |
| 8,675,124 B2 * | 3/2014 | Kawakami | G03B 15/05 348/223.1 |
| 2007/0047944 A1 | 3/2007 | Hayashi et al. | |
| 2009/0208198 A1 * | 8/2009 | Khuntia | G03B 15/06 396/174 |
| 2012/0070137 A1 * | 3/2012 | Watanabe | H04N 5/232 396/50 |

FOREIGN PATENT DOCUMENTS

| | | |
|---|---|---|
| JP | 2007-065081 A | 3/2007 |
| JP | 2009-075340 A | 4/2009 |
| JP | 2009-163179 A | 7/2009 |
| JP | 2011-013555 A | 1/2011 |
| JP | 2011-135165 A | 7/2011 |

\* cited by examiner

FLASH DEVICE AND IMAGE CAPTURE DEVICE PROVIDED WITH FLASH DEVICE

This Application is a U.S. National Phase Application of PCT International Application PCT/JP2012/006113.

TECHNICAL FIELD

The present invention relates to a flash device that controls an irradiation range to which a flashtube emits light, and an image capture device including the flash device.

BACKGROUND ART

Conventionally, in order to obtain a natural image, an image capture device employs bounce photography where flash light emitted from a light emitting section of a flash device is radiated to a reflector such as a ceiling or wall, is diffused, and indirectly illuminates a subject for photographing.

In other words, in the bounce photography, the irradiation surface of the light emitting section of the flash device is pointed to a desired direction pointing to the reflector such as the ceiling or wall without facing the subject, the flash light is reflected on the reflector to illuminate the subject, and the subject is photographed.

A disclosed conventional flash device (for example, Patent Literature 1) is configured so that a control section of the flash device automatically controls the bounce angle between a photographing direction, namely the optical axis direction of a photographing lens, and an irradiation direction in which flash light is radiated (desired direction pointing to the reflector). Thus, the light emitting section of the flash device can emit flash light always in the direction pointing to the reflector, and can indirectly illuminate the subject.

The flash device of Patent Literature 1, however, points respective photographing lens of the image capture device to the reflector and subject and measures the distances to them with automatic focus, and sets the bounce angle based on the distances to the reflector and subject. Therefore, whenever the attitude (photographing direction) of the image capture device is changed in response to the photographing intent, it is required that the control section of the flash device measures the distances with automatic focus, sets the bounce angle again, and changes the irradiation direction to any direction pointing to the reflector. As a result, the flash device of Patent Literature 1 requires a long time for preparation for photographing, and hence photo opportunity is missed.

CITATION LIST

Patent Literature

PTL 1 Unexamined Japanese Patent Publication No. 2009-163179

SUMMARY OF THE INVENTION

In order to address the above-mentioned problems, a flash device of the present invention includes the following elements:
  a flash main body;
  a light emitting section rotatably coupled to the flash main body; and
  a variable mechanism that can vary the angle in the vertical direction of the light emitting section between a normal irradiation direction angle and a desired irradiation direction angle different from the normal irradiation direction angle.

The flash device further includes the following elements:
  a drive section for driving the variable mechanism;
  a vertical direction angle detecting section for detecting the angle in the vertical direction of the light emitting section; and
  a control device for changing, with the drive section, the angle in the vertical direction of the light emitting section to the desired irradiation direction angle based on a detection signal of the vertical direction angle detecting section.

Thus, regardless of the present irradiation direction angle of the flash device, the control device can instantly change the irradiation direction angle to the desired irradiation direction angle based on the irradiation direction angle in the vertical direction of the light emitting section that is automatically detected by the vertical direction angle detecting section. As a result, the time taken for preparation for photographing is reduced, and a subject can be bounce-photographed without missing the photo opportunity.

An image capture device of the present invention has a configuration including the flash device.

Thus, regardless of the present irradiation direction angle of the flash device, the control section can instantly rotate the light emitting section to the desired irradiation direction angle based on the irradiation direction angles of the vertical direction and horizontal direction of the light emitting section that are automatically detected by the vertical direction angle detecting section and horizontal direction angle detecting section. Especially, when the image capture device includes a plurality of flash devices, the irradiation direction angle of each flash device can be changed at a remote position. As a result, an image capture device that can significantly reduce the preparation time for photographing and can bounce-photograph a subject without missing the photo opportunity can be achieved.

DESCRIPTION OF EMBODIMENTS

A flash device and an image capture device including the flash device in accordance with exemplary embodiments of the present invention will be described hereinafter with reference to the accompanying drawings. The following exemplary embodiments show a specified example of the present invention, and do not limit the technical scope of the present invention.

First Exemplary Embodiment

A flash device and an image capture device including the flash device in accordance with a first exemplary embodiment of the present invention are described using FIG. 1 through FIG. 4B.

Figure 1:
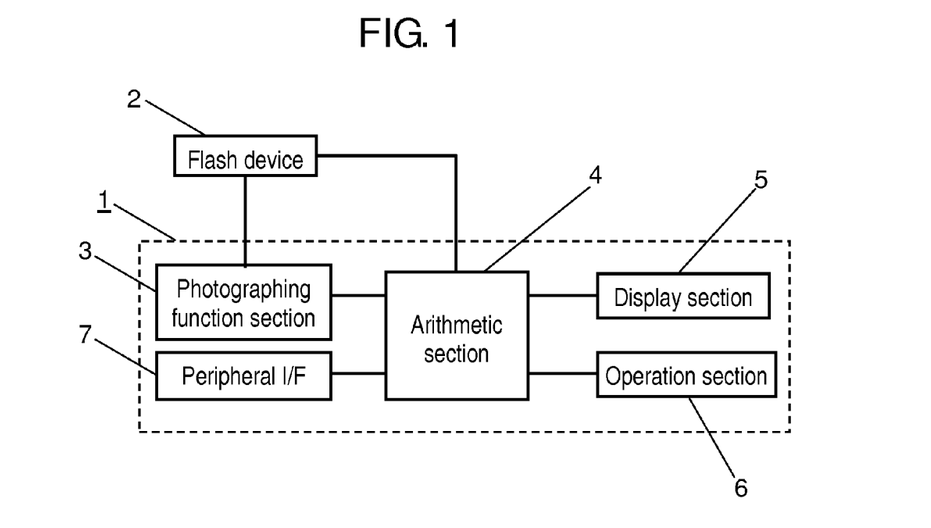
FIG. 1 is a block diagram showing a configuration of an image capture device in accordance with a first exemplary embodiment of the present invention.
Figure 2:
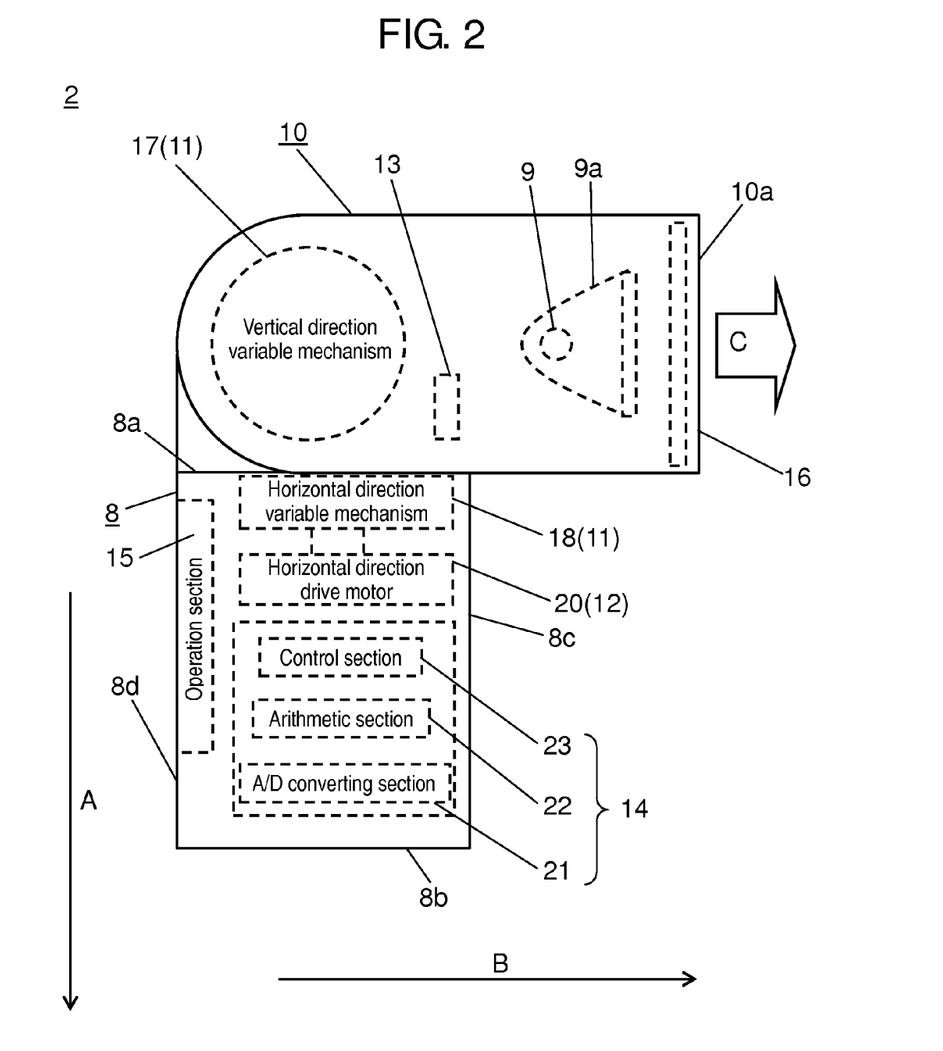
FIG. 2 is a side view of a flash device in accordance with the first exemplary embodiment.
Figure 3:
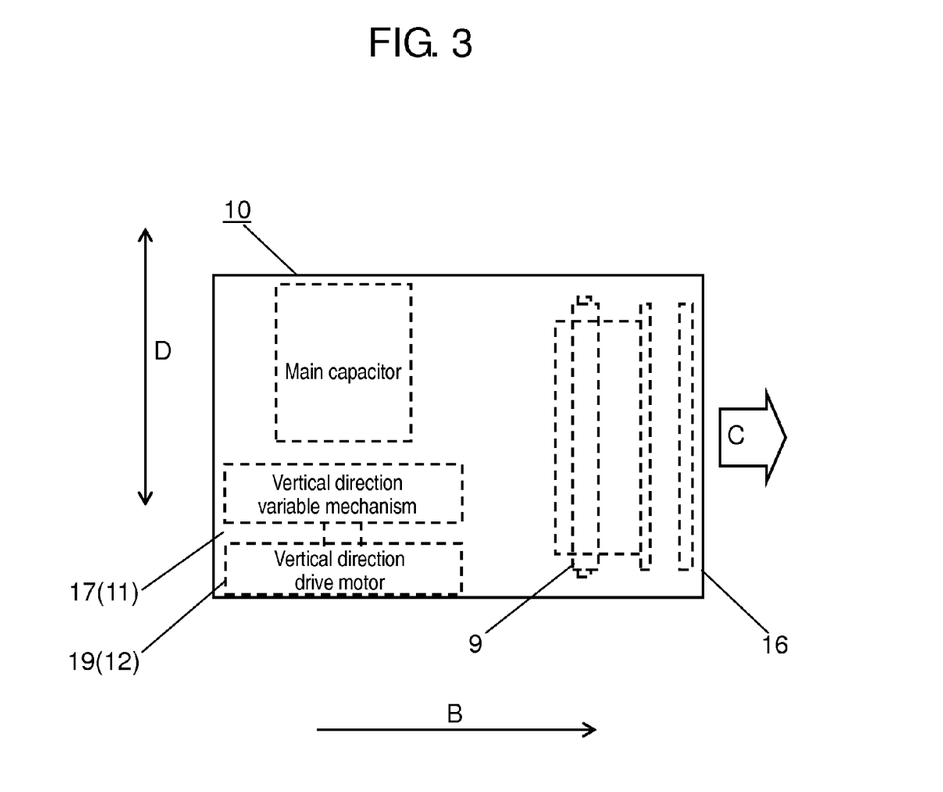
FIG. 3 is a top view of the flash device in accordance with the first exemplary embodiment.
Figure 4A:
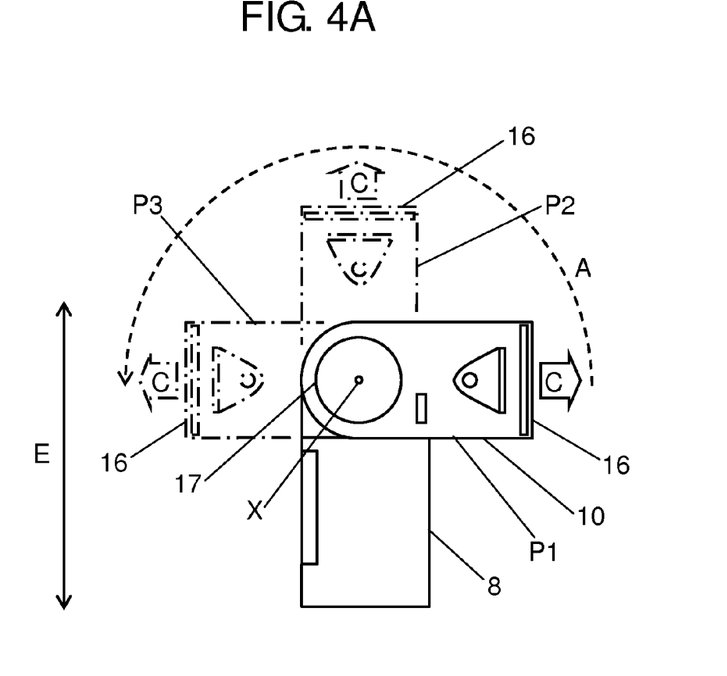
FIG. 4A is an explanatory diagram for illustrating the up-down direction (vertical direction) irradiation range capable of being set by the flash device in accordance with the first exemplary embodiment.
Figure 4B:
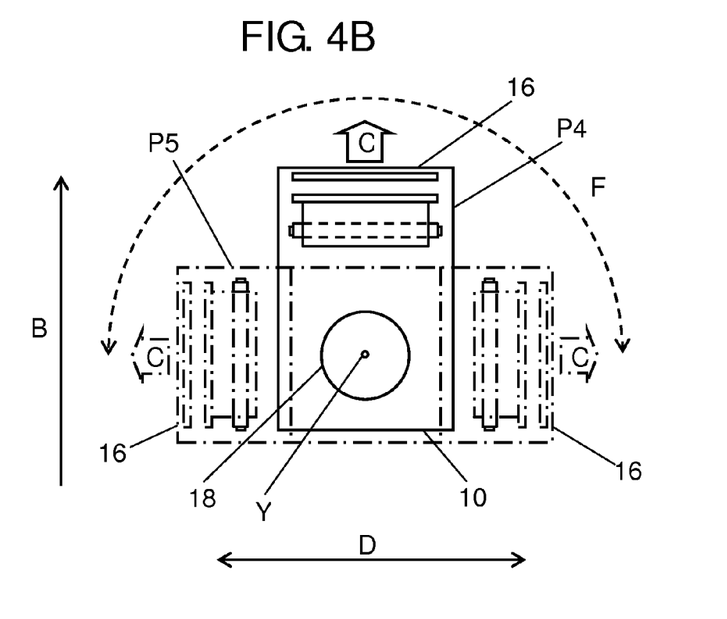
FIG. 4B is an explanatory diagram for illustrating the right-left direction (horizontal direction) irradiation range capable of being set by the flash device in accordance with the first exemplary embodiment.

FIG. 1 is a block diagram showing a configuration of an image capture device in accordance with the first exemplary embodiment of the present invention. FIG. 2 is a side view of the flash device in accordance with the first exemplary embodiment. FIG. 3 is a top view of the flash device in accordance with the first exemplary embodiment. FIG. 4A is an explanatory diagram for illustrating the up-down direction (vertical direction) irradiation range capable of being set by the flash device in accordance with the first exemplary embodiment. FIG. 4B is an explanatory diagram for illustrating the right-left direction (horizontal direction) irradiation range capable of being set by the flash device in accordance with the first exemplary embodiment.

As shown in FIG. 1, image capture device 1 of the present exemplary embodiment includes at least photographing function section 3 for imaging a subject, arithmetic section 4, display section 5, operation section 6, and peripheral I/F (interface) 7. Flash device 2 for radiating flash light to the subject can be attached (detachably) to image capture device 1.

Arithmetic section 4 controls flash device 2 and photographing function section 3. Display section 5 displays an image obtained by imaging of the subject. Operation section 6 sets the photographing condition and switches the power supply between ON and OFF. Peripheral I/F 7 transmits image data or the like between image capture device 1 and peripheral equipment.

As shown in FIG. 2 and FIG. 3, flash device 2 of the present exemplary embodiment includes at least flash main body 8 formed of a casing of a rectangular shape, for example, light emitting section 10, variable mechanism 11, drive section 12, vertical direction angle detecting section 13, control device 14, and operation section 15. Light emitting section 10 is rotatably coupled to flash main body 8, and flashtube 9 is stored in light emitting section 10. Light emitting section 10 reflects the light emitted from flashtube 9 on reflection shade 9a having an opening on the irradiation surface 16 side, and radiates it to the outside. Variable mechanism 11 rotates light emitting section 10 to a desired angle. Vertical direction angle detecting section 13 is disposed in light emitting section 10, and detects the angle in vertical direction A (FIG. 2) of light emitting section 10. Based on a detection signal of vertical direction angle detecting section 13, control device 14 changes the angle in vertical direction A of light emitting section 10 with drive section 12 that is formed of a vertical direction drive motor (shown in FIG. 3), for example. Operation section 15 is disposed in flash main body 8, and a user can set, with operation section 15, a desired irradiation direction angle of light emitting section 10, for example.

Light emitting section 10 is rotatably coupled to the upper surface 8a side of flash main body 8. Image capture device 1 of FIG. 1 can be coupled to the lower surface 8b side of flash main body 8. At this time, lower surface 8b is coupled to image capture device 1 so that front surface 8c of flash main body 8 points to photographing direction B (optical axis direction of a photographing lens) of image capture device 1.

Light emitting section 10 is formed of a casing of a substantially rectangular shape (including a rectangular shape), for example, and one surface 10a side of the casing includes irradiation surface 16 that radiates the light emitted from flashtube 9. Light emitting section 10 is configured so that irradiation direction C of flash light can be changed by changing the angle of irradiation surface 16 in vertical direction A with variable mechanism 11.

As shown in FIG. 2 through FIG. 4B, variable mechanism 11 includes vertical direction variable mechanism 17 and horizontal direction variable mechanism 18, and rotatably couples flash main body 8 to light emitting section 10. Specifically, vertical direction variable mechanism 17 of variable mechanism 11 is coupled to flash main body 8 and light emitting section 10 rotatably in vertical direction A about rotation axis X. Here, rotation axis X is disposed along width direction D (FIG. 3) of flash main body 8. While, horizontal direction variable mechanism 18 of variable mechanism 11 is coupled to them rotatably in horizontal direction F about rotation axis Y. Rotation axis Y is disposed along up-down direction E (height direction: FIG. 4A) of flash main body 8.

Furthermore, vertical direction variable mechanism 17 of variable mechanism 11 is disposed rotatably so that the angle in vertical direction A of light emitting section 10 shown by the solid line in FIG. 4A varies between the following angles:

a normal irradiation direction angle (the angle when light emitting section 10 exists at normal photographing position P1); and a desired irradiation direction angle (the angle when light emitting section 10 exists at bounce photographing position P2 or P3) different from the normal irradiation direction angle.

Here, the desired irradiation direction angle is set by a user and is shown by a dashed line of FIG. 4A. In this case, vertical direction variable mechanism 17 of variable mechanism 11 rotates in a rotation angle range of 180° in the vertical direction between normal photographing position P1 and bounce photographing position P3, for example.

While, horizontal direction variable mechanism 18 of variable mechanism 11 rotates in a rotation angle range of 90° in each of the right and left directions about the position of light emitting section 10 shown by the solid line in FIG. 4B.

Drive section 12, as shown in FIG. 2 and FIG. 3, includes vertical direction drive section 19 (FIG. 3) that is formed of a vertical direction drive motor or the like and rotates and drives vertical direction variable mechanism 17, and horizontal direction drive section 20 (FIG. 2) that is formed of a horizontal direction drive motor or the like and rotates and drives horizontal direction variable mechanism 18.

Vertical direction angle detecting section 13 is formed of a triaxial acceleration sensor for detecting accelerations of three directions of X, Y, and Z axes, for example, in the present exemplary embodiment. Triaxial acceleration sensor detects the gravitational acceleration during rest, and detects the irradiation direction angle (attitude of light emitting section 10) in vertical direction A of light emitting section 10. Thus, the present attitude of light emitting section 10 of flash device 2 can be detected.

As shown in FIG. 2, control device 14 includes at least A/D (analog-to-digital) converting section 21, arithmetic section 22, and control section 23 for controlling drive section 12. A/D converting section 21 A/D-converts the detection signal of vertical direction angle detecting section 13 in the present exemplary embodiment. Based on the converted value obtained by A/D converting section 21 and a specified value of the desired irradiation direction angle, arithmetic section 22 calculates a difference in tilt angle of light emitting section 10 with respect to the desired irradiation direction angle. Control section 23 controls drive section 12 so as to eliminate the difference in tilt angle of light emitting section 10 calculated by arithmetic section 22. In other words, control device 14 changes the angle in vertical direction A of light emitting section 10 from the present tilt angle to the desired irradiation direction angle.

Furthermore, control device 14 can switch the photographing mode between normal photographing mode and bounce photographing mode, for example. In other words, in the normal photographing mode, control device 14 sets the tilt angle of light emitting section 10 at the normal irradiation direction angle so that flash light is radiated in photographing direction B (pointing a subject). In the bounce photographing mode, control device 14 sets the tilt angle of light emitting section 10 at a desired irradiation direction angle so that flash light is radiated in any direction set by the user (when indirect light is intended to be radiated to a subject, the direction points to a reflector such as a ceiling). Thus, the subject can be illuminated while the tilt angle of light emitting section 10 is changed to a desired irradiation direction angle in response to a selected mode, normal photographing mode or bounce photographing mode.

Operation section 15 is disposed on back surface 8d (opposite to the subject side) of flash main body 8. Operation section 15 sets the desired irradiation direction angle in arithmetic section 22 of control device 14 by detecting, with vertical direction angle detecting section 13, the tilt angle when flash device 2 (or only light emitting section 10) is tilted so as to point the desired irradiation direction angle. In other words, operation section 15 rotates light emitting section 10 to an angle intended by the user, and detects the angle in the vertical direction at that time with vertical direction angle detecting section 13. Then, operation section 15 stores the detected value, and sets the user desired irradiation direction angle of light emitting section 10 and the angle in the vertical direction in association with each other.

Hereinafter, the operation of the bounce photographing mode of image capture device 1 of the present exemplary embodiment is described using FIG. 5 and FIG. 6 with reference to FIG. 2.

Figure 5:
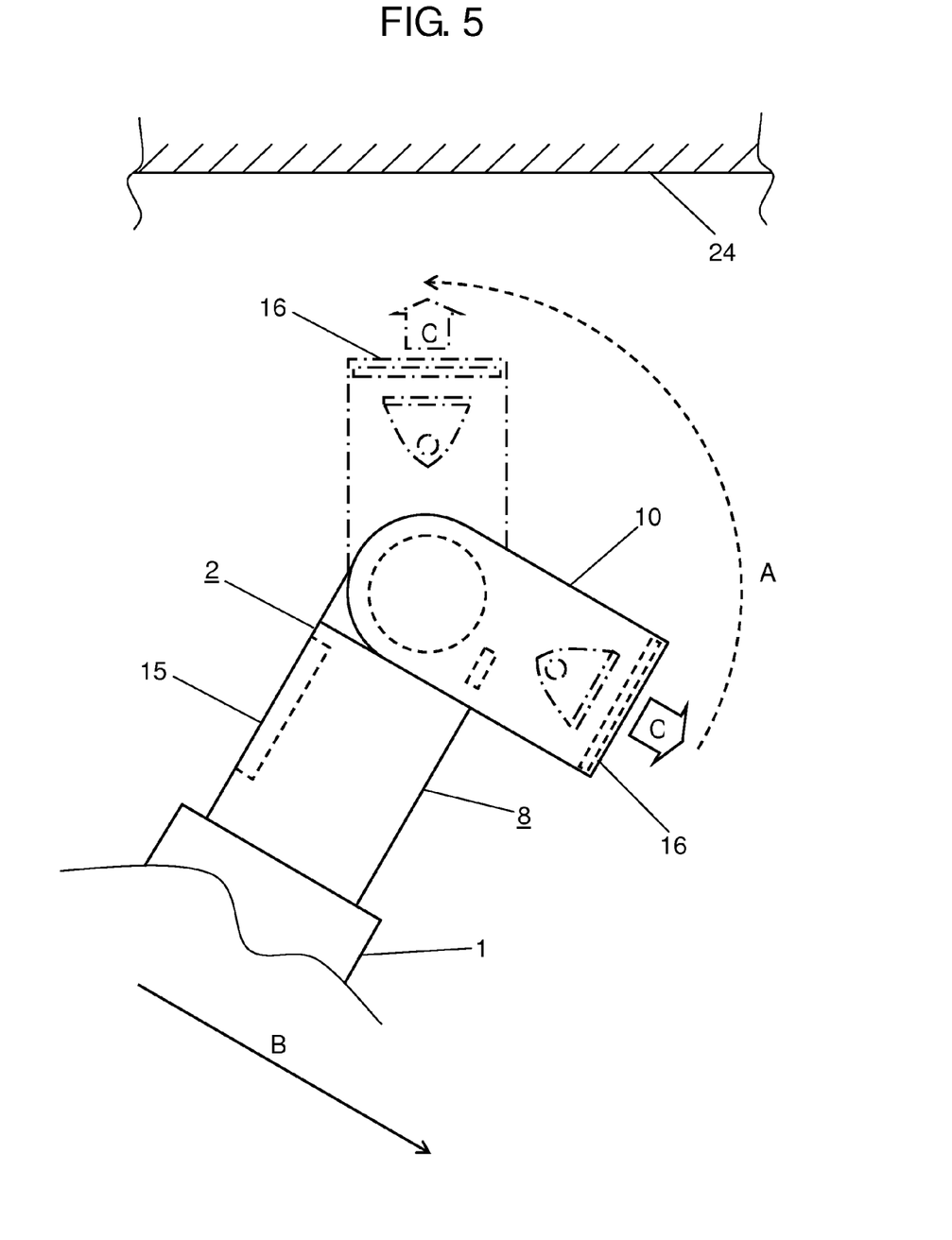
FIG. 5 is an explanatory diagram showing an example of the tilt angle in bounce photographing mode of the flash device in accordance with the first exemplary embodiment.

FIG. 5 is an explanatory diagram showing an example of the tilt angle in the bounce photographing mode of the flash device in accordance with the present exemplary embodiment.

The following case is hereinafter described as an example: the normal photographing mode is selected as the initial state of flash device 2, and flash device 2 is tilted so that irradiation direction C of light emitting section 10 is along photographing direction B as shown in FIG. 5 (corresponding to the state of normal photographing position P1 of FIG. 4A).

First, the user sets, in control device 14, a desired irradiation direction angle in the bounce photographing mode by the following method, as shown in FIG. 2 and FIG. 5.

Specifically, the user firstly points irradiation surface 16 of light emitting section 10 to reflector 24 (ceiling surface in the present exemplary embodiment) that receives the flash light in the bounce photographing mode. At this time, operation section 15 detects, with vertical direction angle detecting section 13, the angle of light emitting section 10 in vertical direction A in the above-mentioned state. Vertical direction angle detecting section 13 inputs a detection signal corresponding to the angle of light emitting section 10 to A/D converting section 21 of control device 14, and A/D-converts the detection signal. A/D converting section 21 then inputs the A/D-converted value to arithmetic section 22 of control device 14. Arithmetic section 22 of control device 14 previously stores the converted value input from A/D converting section 21 as a specified value of the desired irradiation direction angle of light emitting section 10 in the bounce photographing mode.

Figure 6:
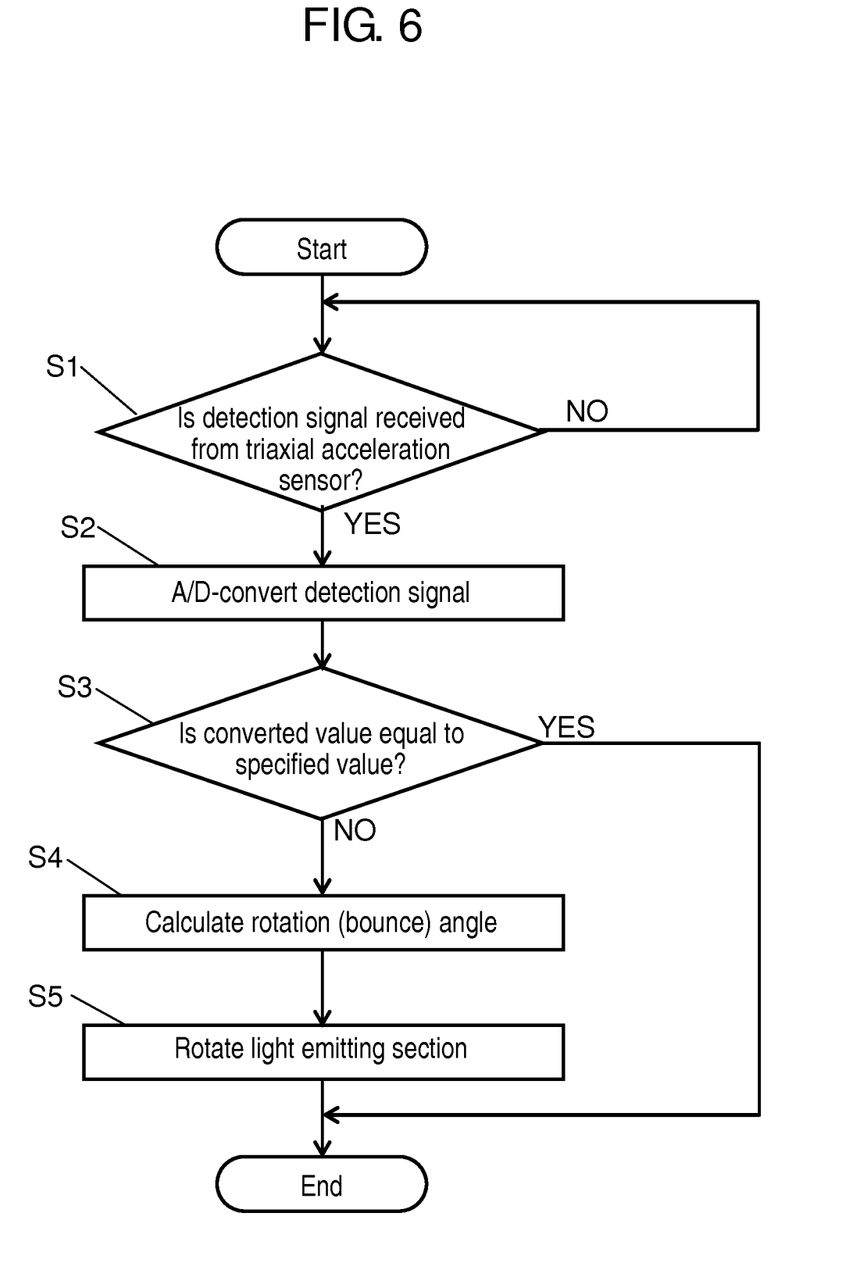
FIG. 6 is a flowchart showing a processing procedure in the bounce photographing mode of the flash device in accordance with the first exemplary embodiment.

Next, the following case is described using FIG. 6: in a state where the specified value of the desired irradiation direction angle of light emitting section 10 is previously stored as discussed above, the user selects the bounce photographing mode and bounce-photographs a subject.

FIG. 6 is a flowchart showing a processing procedure in the bounce photographing mode of the flash device in accordance with the present exemplary embodiment.

First, the user presses the shutter while pointing the imaging lens of image capture device 1 to a subject, thereby starting photographing. At this time, when the present vertical direction angle of flash device 2 is different from the stored specified value of the desired irradiation direction angle, light emitting section 10 is rotated (bounced) to the desired irradiation direction angle in order to radiate the flash light to reflector 24 (ceiling).

Specifically, first, as shown in FIG. 2 and FIG. 6, it is determined whether vertical direction angle detecting section 13 formed of the triaxial acceleration sensor has detected a detection signal (step S1). If vertical direction angle detecting section 13 has detected a detection signal (YES in step S1), the angle in vertical direction A of light emitting section 10 is detected. Then, the detection signal detected by vertical direction angle detecting section 13 is A/D-converted by A/D converting section 21 (step S2). If vertical direction angle detecting section 13 has not detected a detection signal (NO in step S1), a standby state continues until vertical direction angle detecting section 13 detects a detection signal.

Next, arithmetic section 22 of control device 14 determines whether the converted value input from A/D converting section 21 is equal to the specified value of the tilt angle corresponding to the previously set desired irradiation direction angle (step S3).

At this time, if the converted value is not equal to the specified value (NO in step S3), arithmetic section 22 of control device 14 calculates a rotation (bounce) angle (step S4).

Specifically, first, arithmetic section 22 of control device 14 calculates the angle difference (difference in tilt angle of light emitting section 10) between the converted value and the specified value of the tilt angle corresponding to the desired irradiation direction angle.

Then, the calculated difference in tilt angle is input as the rotation angle to control section 23 of control device 14.

Control section 23 of control device 14 rotates light emitting section 10 from the present angle by the input rotation angle corresponding to the difference in tilt angle (step S5).

When the difference in tilt angle of light emitting section 10 is eliminated (specifically, when the converted value is equal to the specified value), the bounce processing of light emitting section 10 is completed.

If the converted value is equal to the specified value (YES in step S3), control section 23 of control device 14 completes the bounce processing of light emitting section 10 without changing the angle of light emitting section 10.

In the present exemplary embodiment, regardless of the present angle of flash device 2 (state before photographing), control device 14 can instantly change the angle to the desired irradiation direction angle based on the angle in the vertical direction of light emitting section 10 that is automatically detected by vertical direction angle detecting section 13.

More specifically, first, control device 14 converts, with A/D converting section 21, the detection signal that is automatically detected by vertical direction angle detecting section 13. Arithmetic section 22 of control device 14 then calculates the difference in tilt angle of light emitting section 10 with respect to the desired irradiation direction angle based on the converted value obtained by A/D converting section 21 and the previously set specified value of the desired irradiation direction angle. Control device 14 controls drive section 12 (vertical direction drive section 19 in the present exemplary embodiment) of control device 14 so that control section 23 eliminates the difference in tilt angle of light emitting section 10 (makes the converted value equal to the specified value). Thus, a complicated processing operation in the bounce photographing mode is reduced, and the tilt angle of light emitting section 10 can be instantly changed to the desired irradiation direction angle. As a result, the time taken for preparation for photographing is reduced, and a subject can be bounce-photographed without missing the photo opportunity.

In the present exemplary embodiment, by using a triaxial acceleration sensor as vertical direction angle detecting section 13, the tilt angle in vertical direction A of light emitting section 10 can be instantly detected. As a result, control device 14 can instantly rotate light emitting section 10 to the desired irradiation direction angle regardless of the present tilt angle in vertical direction A of flash device 2.

In the present exemplary embodiment, using operation section 15, the user can previously and optionally set the desired irradiation direction angle in vertical direction A of light emitting section 10. Therefore, the tilt angle of light emitting section 10 can be easily changed to the desired irradiation direction angle set by operation section 15.

Second Exemplary Embodiment

A flash device and an image capture device including the flash device in accordance with a second exemplary embodiment of the present invention are hereinafter described using FIG. 7.

Figure 7:
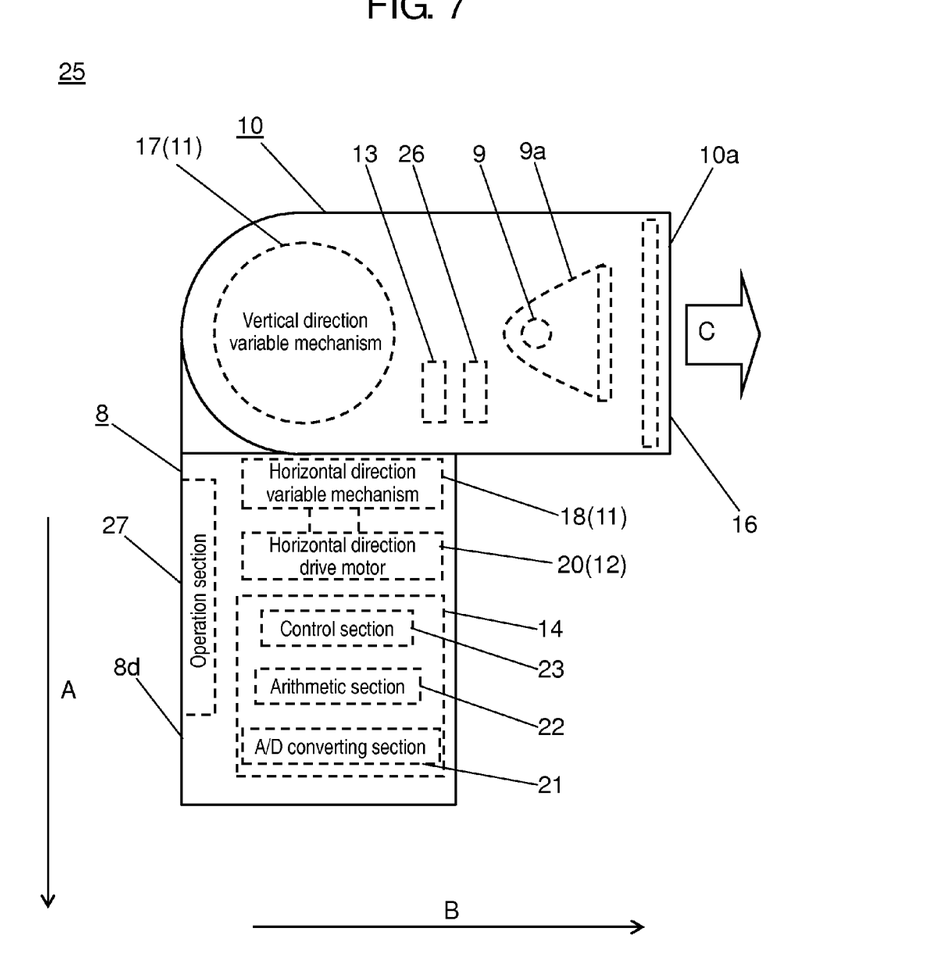
FIG. 7 is a side view of a flash device in accordance with a second exemplary embodiment of the present invention.

FIG. 7 is a side view of a flash device in accordance with the second exemplary embodiment of the present invention.

In other words, flash device 25 and the image capture device including it in accordance with the second exemplary embodiment further include horizontal direction angle detecting section 26, and differ from flash device 2 and image capture device 1 including it in accordance with the first exemplary embodiment in this point.

Hereinafter, horizontal direction angle detecting section 26 included in flash device 25 of the second exemplary embodiment is described mainly. The other configuration and operation are essentially the same as those of flash device 2 and image capture device 1 including it of the first exemplary embodiment, so that similar elements are denoted with the same reference marks, and the descriptions of those elements are omitted.

As shown in FIG. 7, flash device 25 of the second exemplary embodiment includes, in addition to each element of flash device 2 of the first exemplary embodiment, horizontal direction angle detecting section 26 for detecting the tilt angle of flash device 25 in the horizontal direction.

Horizontal direction angle detecting section 26 is formed of a geomagnetic sensor (for example) for detecting the magnitude and direction of the magnetic field, and is disposed in light emitting section 10. The geomagnetic sensor detects the azimuth of light emitting section 10, for example the horizontal azimuth, and detects the irradiation direction angle (attitude of light emitting section 10) in the horizontal direction of light emitting section 10. Thus, horizontal attitude at the present time of light emitting section 10 of flash device 25 can be detected.

Similarly to the first exemplary embodiment, operation section 27 is disposed on back surface 8d of flash main body 8. Operation section 27 allows the user to set light emitting section 10 to desired irradiation direction angles in vertical direction A and horizontal direction F (FIG. 4B) in the present exemplary embodiment.

Hereinafter, the operation of the bounce photographing mode of the image capture device of the present exemplary embodiment is briefly described using FIG. 4B with reference to the first exemplary embodiment.

The following case is hereinafter described as an example: the normal photographing mode is selected as the initial state, and irradiation direction C of light emitting section 10 of flash device 25 is along photographing direction B as shown in FIG. 4B. This case corresponds to the state of normal photographing position P4 of FIG. 4B.

First, the user sets, in control device 14, the desired irradiation direction angle in the bounce photographing mode by the following method.

Specifically, the user firstly points irradiation surface 16 of light emitting section 10 to the reflector that receives the flash light in the bounce photographing mode (corresponding to the state of bounce photographing position P5). At this time, operation section 15 detects, with horizontal direction angle detecting section 26, the angle of light emitting section 10 in horizontal direction F in the above-mentioned state. Horizontal direction angle detecting section 26 A/D-converts the detection signal corresponding to the angle in horizontal direction F of light emitting section 10 with A/D converting section 21 of control device 14, similarly to the first exemplary embodiment. Horizontal direction angle detecting section 26 previously stores the converted value as a specified value of the desired irradiation direction angle in horizontal direction F of light emitting section 10 in the bounce photographing mode.

Next, the user selects the bounce photographing mode, and bounce-photographs a subject.

First, the user presses the shutter while pointing the imaging lens of the image capture device to the subject, thereby starting photographing. At this time, when the present horizontal direction angle of flash device 25 is different from the stored specified value of the desired irradiation direction angle, light emitting section 10 is rotated (bounced) to the desired irradiation direction angle in order to radiate the flash light to the reflector.

Specifically, light emitting section 10 is rotated (bounced) by the method described in the first exemplary embodiment using FIG. 2 and FIG. 6. At this time, vertical direction angle detecting section 13 of the first exemplary embodiment is replaced with horizontal direction angle detecting section 26. Therefore, the description is omitted.

In the present exemplary embodiment, regardless of the present angle (state before photographing) of flash device 2, control device 14 can instantly rotate light emitting section 10 to the desired irradiation direction angle based on the angle in horizontal direction F (FIG. 4B) of light emitting section 10 that is automatically detected by horizontal direction angle detecting section 26.

Thus, light emitting section 10 can be instantly rotated to the desired irradiation direction angle in order to radiate the flash light to the wall as a previously set reflector that horizontally faces light emitting section 10, for example.

In the present exemplary embodiment, by using a geomagnetic sensor as horizontal direction angle detecting section 26, the angle in horizontal direction F of light emitting section 10 can be instantly detected. Thus, the complicated processing operation in the bounce photographing mode can be reduced, and control device 14 can instantly rotate light emitting section 10 to the desired irradiation direction angle in horizontal direction F regardless of the present angle in horizontal direction F of flash device 25. As a result, the time taken for preparation for photographing is reduced, and a subject can be bounce-photographed without missing the photo opportunity.

The flash device and the image capture device including the flash device of the present invention are not limited to those in each of the above-mentioned exemplary embodiments, but can be modified within the scope of the present invention.

Each of the present exemplary embodiments has described an example where operation section 15 or 27 is disposed in flash main body 8, but the present invention is not limited to this. For example, operation sections 15 and 27 may be disposed in light emitting section 10.

Each of the present exemplary embodiments has described an example where operation section 15 or 27 is disposed in flash main body 8 or light emitting section 10 and the user directly operates operation section 15 or 27. However, the present invention is not limited to this. For example, the following configuration may be employed: a signal transmitting/receiving section for transmitting/receiving a signal from the outside is disposed in the light emitting section or flash main body of the flash device, and, in addition, a remote operation device capable of remotely operating the operation section via the signal transmitting/receiving section disposed in the flash device is detachably attached to the light emitting section or flash main body. Thus, the desired irradiation direction angle of the flash device can be transmitted from the remote operation device to the signal transmitting/receiving section by a radio system (wireless system), for example, and can be set.

At this time, the signal transmitting/receiving section includes at least a receiving section for receiving a signal related to the desired irradiation direction angle from the remote operation device.

The remote operation device includes an input interface such as an operation button or operation lever used for inputting information such as the desired irradiation direction angle, and a transmitting section for transmitting a signal to the signal transmitting/receiving section by a radio system using light or electric wave. The remote operation device may have a configuration where it communicates with the operation section via the signal transmitting/receiving section or a configuration where it directly communicates with a control section without the operation section.

The communication system between the remote operation device and the signal transmitting/receiving section is not limited to the radio system, but may be a wired system using a communication cable.

The remote operation device is not limited to a dedicated device disposed for remotely operating the light emitting section. The remote operation device may be an information processing device such as an image capture device, computer, portable phone, or personal digital assistant that can read a program for remotely operating the light emitting section. At this time, preferably, the information processing device is configured to communicate with the flash device using a communicating function disposed in the information processing device.

Thus, the user can remotely set the desired irradiation direction angle in the operation section of the flash device. As a result, regardless of the present angle of the flash device, based on the automatically detected angle in the vertical direction (or vertical direction and horizontal direction) of the light emitting section, the control section of the control device can instantly change the irradiation direction angle to the desired irradiation direction angle with at least the vertical direction angle detecting section (or vertical direction angle detecting section and horizontal direction angle detecting section).

Each of the present exemplary embodiments has described an example where vertical direction angle detecting section 13 and horizontal direction angle detecting section 26 are disposed in light emitting section 10 and detect the angles in vertical direction A and horizontal direction F of light emitting section 10. The present invention is not limited to this. For example, the vertical direction angle detecting section and horizontal direction angle detecting section may be disposed in the flash main body. Thus, the vertical direction angle detecting section and horizontal direction angle detecting section can detect not the tilt angle of the light emitting section but the angle of the flash main body.

Hereinafter, a specific operation in the above-mentioned configuration is described.

First, the control device stores, in the arithmetic section, the present tilt angle of the light emitting section with respect to the flash main body.

Then, when calculating the rotation (bounce) angle with the arithmetic section, the control device calculates the angle of the light emitting section based on the tilt angle and the angle of the flash main body.

Then, similarly to the exemplary embodiments, the light emitting section is instantly rotated to the desired irradiation direction angle with the control section of the control device.

In other words, in the above-mentioned configuration, the flash main body is fixed to the image capture device, so that the irradiation direction angle is changed by rotating the light emitting section. While the light emitting section is changed from the normal irradiation position to the bounce irradiation position, the flash main body remains at rest, but the light emitting section is rotated (bounced). Since the flash main body remains at rest even while the position of the light emitting section is changed to the bounce irradiation position, the angle of the light emitting section can be detected by the triaxial acceleration sensor disposed in the light emitting section. Thus, even while the position of the light emitting section is changed, the angle of the light emitting section can be detected. As a result, the rotation (bounce) angle can be more accurately controlled.

Each of the present exemplary embodiments has described a configuration example where operation section 15 or 27 of flash device 2 is disposed in flash main body 8, but the present invention is not limited to this. For example, the operation section may be disposed in the light emitting section or image capture device. Thus, the degree of freedom in design of the flash device or image capture device can be increased.

Each of the present exemplary embodiments has described a configuration example where flash device 2 (or image capture device 1) and light emitting section 10 are tilted to align light emitting section 10 to bounce photographing position P2, the angle at that time is detected by vertical direction angle detecting section 13, and the desired irradiation direction angle is set. However, the present invention is not limited to this. For example, a configuration may be employed where the user directly inputs the angle of the light emitting section using the operation section to set the desired irradiation direction angle. Alternatively, the desired irradiation direction angle may be previously set by the control section.

Each of the present exemplary embodiments has described an example where the maximum rotation range of vertical direction variable mechanism 17 is 180°, but the present invention is not limited to this. For example, the maximum rotation range of the vertical direction variable mechanism may be 90°. Also in this case, by combining the vertical direction variable mechanism with the horizontal direction variable mechanism, the angle in the up-down direction (vertical direction) of light emitting section 10 can be changed from the normal irradiation position by up to 180° about rotation axis X, similarly to the present exemplary embodiments. In other words, when the vertical direction variable mechanism is required to be rotated in a range from 90° to 180°, this range can be achieved by configuring the horizontal direction variable mechanism so that it rotates by 180° in each of right and left directions.

Each of the present exemplary embodiments has described a configuration example where vertical direction angle detecting section 13 detects the angle in vertical direction A of light emitting section 10 and control device 14 detects the tilt angle. However, the present invention is not limited to this. For example, vertical direction angle detecting section 13 detects vertical direction A of light emitting section 10 and detects the tilt angle of light emitting section 10 based on the detection value.

Each of the present exemplary embodiments has described a configuration example where the irradiation direction of flash light is always pointed to a desired direction appropriate for the bounce photographing, but the present invention is not limited to this. For example, the following configuration may be employed:

the vertical direction angle detecting section and horizontal direction angle detecting section are combined with a range sensor or a light receiving sensor for receiving the flash light radiated from the light emitting section, the range sensor or light receiving sensor is applied to a distance measuring section for measuring the distance to a subject or reflector, and the light emitting section is controlled so that the irradiation direction of the flash light points to the subject or reflector.

Each of the present exemplary embodiments has described a configuration example where the tilt angle of the light emitting section is varied with respect to the flash main body, but the present invention is not limited to this. For example, a configuration may be employed where reflection shade 9a storing flashtube 9 of light emitting section 10 shown in FIG. 2 is set to always point to a desired direction and flash light is radiated to the reflector.

Each of the present exemplary embodiments has described an example where flash device 2 or 25 can be attached (detachably) to the image capture device, but the present invention is not limited to this. For example, a configuration may be employed where the flash device is built in the image capture device. Thus, the image capture device can be made to be compact.

Each of the present exemplary embodiments has described a configuration example where A/D converting section 21, arithmetic section 22, and control section 23 of control device 14 are included inside flash main body 8, but the present invention is not limited to this. For example, a part or the whole of A/D converting section 21, arithmetic section 22, and control section 23 constituting control device 14 may be disposed in the image capture device. In this case, by connecting the flash device to the image capture device, the control device controls the image capture device.

Each of the present exemplary embodiments has described a configuration example where one flash device is connected to the image capture device, but the present invention is not limited to this. For example, a plurality of flash devices may be connected to the image capture device. Thus, flash light is radiated to a plurality of reflectors to bounce-photograph a subject.

At this time, preferably, bounce-photographing is performed by remotely operating the plurality of flash devices. Thus, the irradiation direction angle of each flash device can be changed at a remote position. As a result, an image capture device can be achieved where the preparation time for photographing is significantly reduced and a subject can be bounce-photographed without missing the photo opportunity.

The first exemplary embodiment has described a configuration example where the light emitting section is instantly rotated to the desired irradiation direction angle in the vertical direction. The second exemplary embodiment has described another configuration example where the light emitting section is instantly rotated to the desired irradiation direction angle in the horizontal direction. However, the present invention is not limited to this. For example, a configuration may be employed where the light emitting section is instantly rotated simultaneously to the desired irradiation direction angles in the vertical direction and horizontal direction. Thus, flash light can be radiated in any direction for bounce-photographing. As a result, the application range such as a photographing state of a subject can be significantly improved.

As discussed above, the flash device of the present invention includes the following elements:
  a flash main body;
  a light emitting section rotatably coupled to the flash main body; and
  a variable mechanism that can vary the angle in the vertical direction of the light emitting section between a normal irradiation direction angle and a desired irradiation direction angle different from the normal irradiation direction angle.

The flash device further includes the following elements:
  a drive section for driving the variable mechanism;
  a vertical direction angle detecting section for detecting the angle in the vertical direction of the light emitting section; and
  a control device for changing, with the drive section, the angle in the vertical direction of the light emitting section to the desired irradiation direction angle based on a detection signal of the vertical direction angle detecting section.

In this configuration, regardless of the present irradiation direction angle of the flash device, the control device can instantly change the irradiation direction angle to the desired irradiation direction angle based on the irradiation direction angle in the vertical direction of the light emitting section that is automatically detected by the vertical direction angle detecting section. As a result, the time taken for preparation for photographing is reduced, and a subject can be bounce-photographed without missing the photo opportunity.

In the flash device of the present invention, the vertical direction angle detecting section is disposed in one of the flash main body and light emitting section. In this configuration, the degree of freedom in design of the flash device can be increased.

In the flash device of the present invention, the control device includes the following elements:
  an A/D converting section that A/D-converts a detection signal of the vertical direction angle detecting section;

an arithmetic section that calculates a difference in tilt angle of the light emitting section based on the converted value obtained by the A/D converting section and a previously set specified value of the desired irradiation direction angle; and a control section that controls the drive section so as to eliminate the difference in tilt angle of the light emitting section.

In this configuration, the control device calculates, with the arithmetic section, the difference in tilt angle of the light emitting section based on the converted value and the previously set specified value of the desired irradiation direction angle. Here, the converted value is obtained by converting, with the A/D converting section, the detection signal automatically detected by the vertical direction angle detecting section. The control section of the control device controls the drive section so as to eliminate the difference in tilt angle of the light emitting section (make the specified value equal to the converted value). Thus, the control device can instantly change the irradiation direction angle of the light emitting section to the desired irradiation direction angle.

In the flash device of the present invention, the vertical direction angle detecting section is formed of a triaxial acceleration sensor.

In this configuration, the triaxial acceleration sensor can detect the irradiation direction angle in the vertical direction of the light emitting section. Thus, the control device can instantly rotate the light emitting section to the desired irradiation direction angle in the vertical direction regardless of the irradiation direction angle in the vertical direction of the flash device.

In the flash device of the present invention, the variable mechanism includes a horizontal direction variable mechanism that can change the angle in the horizontal direction of the light emitting section. The drive section includes a horizontal direction drive section for driving the horizontal direction variable mechanism, and, in addition, a horizontal direction angle detecting section for detecting the angle in the horizontal direction of the light emitting section. The control device changes, with the drive section, the angle in the horizontal direction of the light emitting section to the desired irradiation direction angle in the horizontal direction based on a detection signal of the horizontal direction angle detecting section.

In this configuration, regardless of the present irradiation direction angle of the flash device, the control device can instantly change the irradiation direction angle to the desired irradiation direction angle based on the irradiation direction angle in the horizontal direction of the light emitting section that is automatically detected by the horizontal direction angle detecting section. Thus, a subject can be bounce-photographed using not only a reflector of the vertical direction but also a reflector of the horizontal direction. As a result, the reflection range of bounce-photographing is enlarged, and the degree of freedom in photographing can be increased.

In the flash device of the present invention, the horizontal direction angle detecting section is disposed in one of the flash main body and light emitting section. In this configuration, the degree of freedom in design of the flash device can be increased.

In the flash device of the present invention, the horizontal direction angle detecting section is formed of a geomagnetic sensor.

In this configuration, the irradiation direction angle in the horizontal direction of the light emitting section can be detected by the geomagnetic sensor. Thus, regardless of the present irradiation direction angle in the horizontal direction of the flash device, the control device can instantly rotate the light emitting section to the desired irradiation direction angle in the horizontal direction.

In the flash device of the present invention, an operation section capable of setting the desired irradiation direction angle is disposed in at least one of the flash main body and light emitting section.

In this configuration, the user can set, with the operation section, the desired irradiation direction angle in the vertical direction of the light emitting section. Thus, the irradiation direction angle of the light emitting section can be optionally changed to the desired irradiation direction angle set with the operation section.

In the flash device of the present invention, an operation section capable of setting the desired irradiation direction angle in the horizontal direction is disposed in at least one of the flash main body and light emitting section.

In this configuration, the user can set, with the operation section, the desired irradiation direction angle in the horizontal direction in the light emitting section. Thus, the irradiation direction angle of the light emitting section can be changed to the desired irradiation direction angle in the horizontal direction set with the operation section.

In the flash device of the present invention, the desired irradiation direction angle can be remotely set in the operation section. In this configuration, the user can remotely set the desired irradiation direction angle in the operation section. Thus, even when the user performs photographing at a place separate from the flash device, the user can change the irradiation direction of the flash device without moving to the installation place of the flash device.

In the flash device of the present invention, the operation section further includes a remote operation section capable of remotely setting the desired irradiation direction angle. In this configuration, the user can remotely set the desired irradiation direction angle using the remote operation section.

In the flash device of the present invention, the operation section transmits the desired irradiation direction angle by radio. In this configuration, the user can remotely set the desired irradiation direction angle.

Thus, even when the user performs photographing at a place separate from the flash device, the user can change the irradiation direction of the flash device without moving to the installation place of the flash device.

The image capture device of the present invention has a configuration including the flash device.

In this configuration, regardless of the present irradiation direction angle of the flash device, the control device can instantly change the irradiation direction angle to the desired irradiation direction angle based on the irradiation direction angles in the vertical direction and horizontal direction of the light emitting section. These irradiation direction angles are automatically detected by the vertical direction angle detecting section and the horizontal direction angle detecting section. Especially, when an image capture device including a plurality of flash devices is employed, the irradiation direction angle of each flash device can be changed at a remote position. Thus, an image capture device can be achieved where the preparation time for photographing is significantly reduced and a subject can be bounce-photographed without missing the photo opportunity.

INDUSTRIAL APPLICABILITY

The present invention is useful for a flash device requiring bounce photography where the irradiation direction of flash light is instantly changed from the present irradiation direction to a desired irradiation direction and a subject is photographed without missing the photo opportunity, and is useful for an image capture device including the flash device.

REFERENCE MARKS IN THE DRAWINGS 1 image capture device
2, 25 flash device
3 photographing function section
4 arithmetic section
5 display section
6 operation section
7 peripheral I/F
8 flash main body
8a upper surface
8b lower surface
8c front surface
8d back surface
9 flashtube
9a reflection shade
10 light emitting section
10a one surface
11 variable mechanism
12 drive section
13 vertical direction angle detecting section
14 control device
15, 27 operation section
16 irradiation surface
17 vertical direction variable mechanism
18 horizontal direction variable mechanism
19 vertical direction drive section
20 horizontal direction drive section
21 A/D converting section
22 arithmetic section
23 control section
26 horizontal direction angle detecting section

The invention claimed is:

1. A flash device comprising:
a flash main body;
a light emitting section rotatably coupled to the flash main body;
a variable mechanism capable of varying an angle in a vertical direction of the light emitting section between a normal irradiation direction angle and a desired irradiation direction angle different from the normal irradiation direction angle;
a drive section for driving the variable mechanism;
a vertical direction angle detecting section for detecting the angle in the vertical direction of the light emitting section, the vertical direction angle detecting section being disposed in the light emitting section; and
a control device comprising:
an arithmetic section for calculating a tilt angle of the light emitting section based on a signal detected by the vertical direction angle detecting section, comparing the tilt angle of the light emitting section with the desired irradiation direction angle, and setting a rotation angle so as to resolve a difference of angle in case that the tilt angle of the light emitting section does not equal to the desired irradiation direction angle; and
a control section for controlling the drive section based on the rotation angle.

2. The flash device of claim 1, wherein
the control device further comprises an A/D converting section for A/D-converting the detection signal of the vertical direction angle detecting section, and
wherein the arithmetic section calculates the difference of angle based on a converted value obtained by the A/D converting section and a previously set specified value of the desired irradiation direction angle.

3. The flash device of claim 1, wherein
the vertical direction angle detecting section is formed of a triaxial acceleration sensor.

4. The flash device of claim 1, wherein
the variable mechanism includes a horizontal direction variable mechanism capable of changing an angle in a horizontal direction of the light emitting section,
the drive section includes a horizontal direction drive section for driving the horizontal direction variable mechanism,
the flash device further includes a horizontal direction angle detecting section for detecting the angle in the horizontal direction of the light emitting section, and
the control device changes, with the drive section, the angle in the horizontal direction of the light emitting section to the desired irradiation direction angle in the horizontal direction based on a detection signal of the horizontal direction angle detecting section.

5. The flash device of claim 4, wherein
the horizontal direction angle detecting section is disposed in one of the flash main body and the light emitting section.

6. The flash device of claim 4, wherein
the horizontal direction angle detecting section is formed of a geomagnetic sensor.

7. The flash device of claim 1, further comprising an operation section capable of setting the desired irradiation direction angle.

8. The flash device of claim 4, further comprising
an operation section capable of setting the desired irradiation direction angle in the horizontal direction.

9. An image capture device comprising the flash device of claim 1.

10. A flash device comprising:
a flash main body;
a light emitting section rotatably coupled to the flash main body;
a variable mechanism capable of varying an angle in a vertical direction of the light emitting section between a normal irradiation direction angle and a desired irradiation direction angle different from the normal irradiation direction angle;
a drive section for driving the variable mechanism;
a vertical direction angle detecting section for detecting the angle in the vertical direction of the light emitting section, the vertical direction angle detecting section being disposed in the flash main body; and
a control device comprising:
an arithmetic section for calculating a tilt angle of the light emitting section based on a signal detected by the vertical direction angle detecting section and an angle of the light emitting section against the flash main body, comparing the tilt angle of the light emitting section with the desired irradiation direction angle, and setting a rotation angle so as to resolve a difference of angle in case that the tilt angle of the light emitting section does not equal to the desired irradiation direction angle; and
a control section for controlling the drive section based on the rotation angle.

11. The flash device of claim 10, wherein
the control device further comprises an A/D converting section for A/D-converting the detection signal of the vertical direction angle detecting section, and
the arithmetic section calculates the difference of angle based on a converted value obtained by the A/D converting section and a previously set specified value of the desired irradiation direction angle.

12. The flash device of claim 10, wherein
the vertical direction angle detecting section is formed of a triaxial acceleration sensor.

13. The flash device of claim 10, wherein
the variable mechanism includes a horizontal direction variable mechanism capable of changing an angle in a horizontal direction of the light emitting section,
the drive section includes a horizontal direction drive section for driving the horizontal direction variable mechanism,
the flash device further includes a horizontal direction angle detecting section for detecting the angle in the horizontal direction of the light emitting section, and
the control device changes, with the drive section, the angle in the horizontal direction of the light emitting section to the desired irradiation direction angle in the horizontal direction based on a detection signal of the horizontal direction angle detecting section.

14. The flash device of claim 13, wherein
the horizontal direction angle detecting section is disposed in one of the flash main body and the light emitting section.

15. The flash device of claim 13, wherein
the horizontal direction angle detecting section is formed of a geomagnetic sensor.

16. The flash device of claim 10, further comprising an operation section capable of setting the desired irradiation direction angle.

17. The flash device of claim 13, further comprising an operation section capable of setting the desired irradiation direction angle in the horizontal direction.

18. An image capture device comprising the flash device of claim 10.

* * * * *